(12) United States Patent
Bernat et al.

(10) Patent No.: US 10,547,680 B2
(45) Date of Patent: Jan. 28, 2020

(54) SYSTEMS, METHODS, AND APPARATUSES FOR RANGE PROTECTION

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Raj K. Ramanujan, Federal Way, WA (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 14/983,087

(22) Filed: Dec. 29, 2015

(65) Prior Publication Data

US 2017/0187805 A1 Jun. 29, 2017

(51) Int. Cl.
*H04L 29/08* (2006.01)
*G06F 3/06* (2006.01)
*G06F 9/46* (2006.01)

(52) U.S. Cl.
CPC ........ *H04L 67/1097* (2013.01); *G06F 3/0605* (2013.01); *G06F 3/0619* (2013.01); *G06F 3/0653* (2013.01); *G06F 3/0673* (2013.01); *G06F 9/467* (2013.01); *H04L 67/2809* (2013.01)

(58) Field of Classification Search
CPC ..... H04L 67/1097; G06F 9/467; G06F 3/0605
See application file for complete search history.

(56) References Cited

U.S. PATENT DOCUMENTS

| | | | |
|---|---|---|---|
| 6,961,806 B1 * | 11/2005 | Agesen | G06F 9/45537 711/148 |
| 7,310,709 B1 | 12/2007 | Aingaran et al. | |
| 7,516,277 B2 | 4/2009 | Kilian et al. | |
| 7,613,882 B1 * | 11/2009 | Akkawi | G06F 12/0833 709/214 |
| 8,347,064 B1 | 1/2013 | Glasco et al. | |
| 8,838,430 B1 * | 9/2014 | Lang | G06F 17/5009 703/14 |

(Continued)

OTHER PUBLICATIONS

Final Office Action from U.S. Appl. No. 14/983,052, dated Oct. 6, 2017, 13 pages.

(Continued)

*Primary Examiner* — Nicholas R Taylor
*Assistant Examiner* — Sanjoy K Roy
(74) *Attorney, Agent, or Firm* — Nicholson De Vos Webster & Elliott LLP

(57) ABSTRACT

Systems, methods, and apparatuses for range protection. In some embodiments, an apparatus comprises at least one monitoring circuit to monitor for memory accesses to an address space and take action upon a violation to the address space, wherein the action is one of generating a notification to a node that requested the monitor, generating the wrong request, generate a notification in a specific context of the home node, and generating a notification in a node that has ownership of the address space; at least one a protection table to store an identifier of the address space; and at least one hardware core to execute an instruction to enable the monitoring circuit.

6 Claims, 20 Drawing Sheets

(56) References Cited

U.S. PATENT DOCUMENTS

| | | | |
|---|---|---|---|
| 9,208,091 B2 | 12/2015 | Blaner et al. | |
| 2008/0034355 A1* | 2/2008 | Shen | G06F 8/443 717/148 |
| 2009/0157970 A1 | 6/2009 | Kornegay et al. | |
| 2010/0138607 A1 | 6/2010 | Hughes et al. | |
| 2011/0087843 A1 | 4/2011 | Zhao et al. | |
| 2012/0117334 A1* | 5/2012 | Sheaffer | G06F 12/0831 711/145 |
| 2012/0151153 A1 | 6/2012 | Jantsch et al. | |
| 2013/0124805 A1 | 5/2013 | Rafacz et al. | |
| 2013/0243003 A1* | 9/2013 | Oda | G06F 12/14 370/401 |
| 2013/0268711 A1 | 10/2013 | Safranek et al. | |
| 2014/0281180 A1 | 9/2014 | Tune | |
| 2014/0379997 A1* | 12/2014 | Blaner | G06F 12/0831 711/146 |
| 2016/0179674 A1 | 6/2016 | Sury et al. | |
| 2017/0185517 A1 | 6/2017 | Guim et al. | |
| 2017/0185518 A1 | 6/2017 | Guim et al. | |

OTHER PUBLICATIONS

International Preliminary Report on Patentability for Application No. PCT/US2016/069063, dated Jul. 12, 2018, 14 pages.
International Preliminary Report on Patentability for Application No. PCT/US2016/069064, dated Jul. 12, 2018, 11 pages.
International Preliminary Report on Patentability for Application No. PCT/US2016/069066, dated Jul. 12, 2018, 14 pages.
International Search Report and Written Opinion for Application No. PCT/US2016/069063, dated May 30, 2017, 15 pages.
International Search Report and Written Opinion for Application No. PCT/US2016/069064, dated Apr. 17, 2017, 12 pages.
International Search Report and Written Opinion for Application No. PCT/US2016/069066, dated Apr. 13, 2017, 15 pages.
Non-Final Office Action from U.S. Appl. No. 14/983,052, dated Nov. 13, 2018, 14 pages.
Non-Final Office Action from U.S. Appl. No. 14/983,052, dated Apr. 5, 2018, 17 pages.
Non-Final Office Action from U.S. Appl. No. 14/983,052, dated Apr. 6, 2017, 12 pages.
Non-Final Office Action from U.S. Appl. No. 14/983,081, dated Jun. 20, 2017, 7 pages.
Notice of Allowance from U.S. Appl. No. 14/983,081, dated Jan. 26, 2018, 13 pages.
Notice of Allowance from U.S. Appl. No. 14/983,081, dated Jun. 8, 2018, 13 pages.
Notice of Allowance from U.S. Appl. No. 14/983,081, dated Oct. 11, 2017, 9 pages.
Restriction Requirement from U.S. Appl. No. 14/983,081, dated Mar. 22, 2017, 6 pages.

* cited by examiner

RECEIVING, AT A PROXY OF A NODE, A REQUEST TO START A PROTECTION MONITOR 501
SENDING THE REQUEST TO CORES, CACHING AGENTS, AND OTHER PROXIES WITHIN THE NODE TO INITIALIZE MONITORING OF THE ADDRESS (RANGE) 503
RECEIVING ACKNOWLEDGMENTS FROM THE CORES, CACHING AGENTS, AND OTHER PROXIES (IF APPLICABLE) 505
SENDING AN ACKNOWLEDGMENT TO THE ORIGINATING CORE 507
FIG. 5

RECEIVING, AT A PROXY OF A NODE, A REQUEST TO RELEASE A MONITOR TO STOP PROECTING A RANGE 601
SENDING THE REQUEST TO CORES, CACHING AGENTS, AND OTHER PROXIES WITHIN THE NODE TO STOP THE MONITOR (CLEAR MONITORING TABLE ENTRY) 603
RECEIVING ACKNOWLEDGMENTS FROM THE CORES, CACHING AGENTS, AND OTHER PROXIES (IF APPLICABLE) 605
SENDING AN ACKNOWLEDGMENT TO THE ORIGINATING CORE 607
FIG. 6

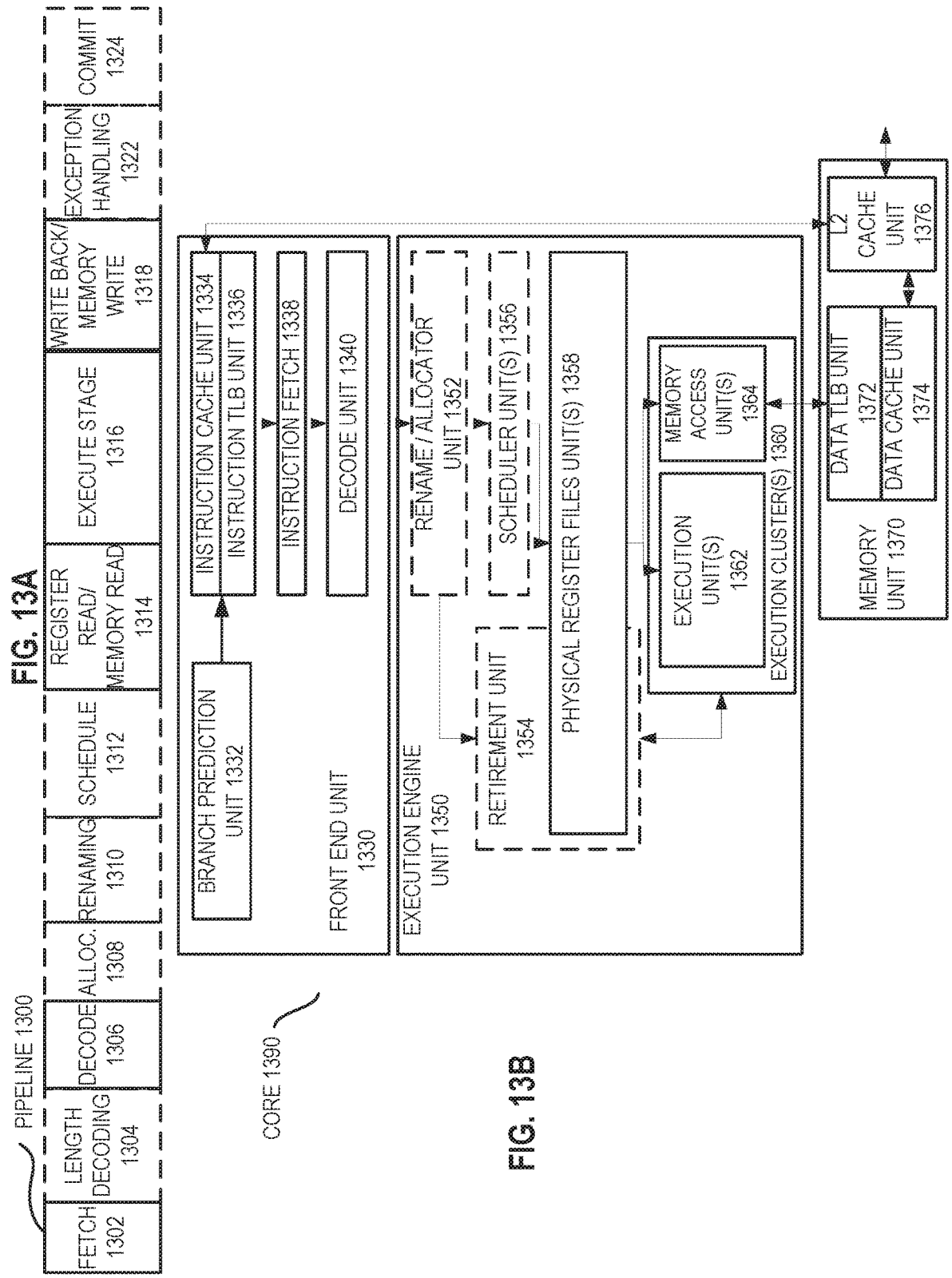

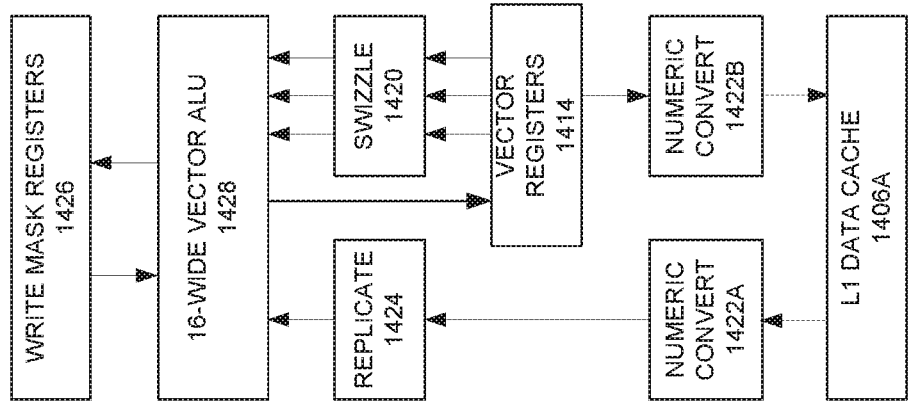
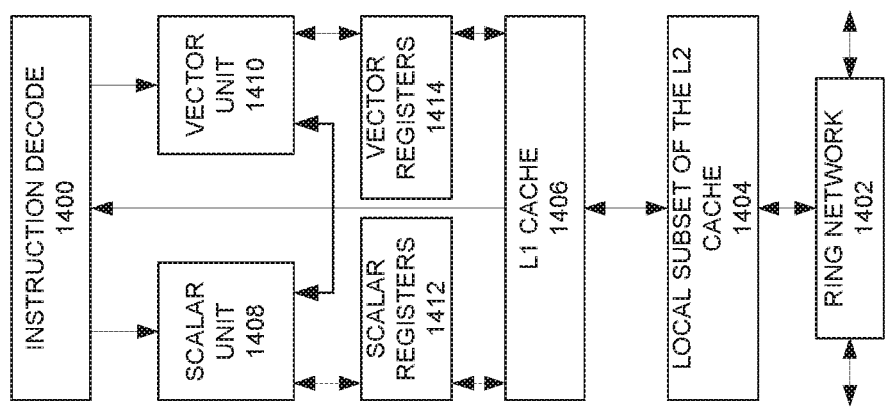

SYSTEMS, METHODS, AND APPARATUSES FOR RANGE PROTECTION

FIELD OF INVENTION

The field of invention relates generally to computer processor architecture, and, more specifically, to instructions which when executed cause a particular result.

BACKGROUND

An extension to instruction set architecture (ISA) provides interfaces for software to work with transactional memory (TM) support. The basic goal is to speed-up multi-threaded workloads by providing hardware schemes that let these workloads execute certain group of operations through lock elision. A commercial example of TM is Hardware Lock Elision (HLE) and Restricted Transactional Memory (RTM).

HLE extensions add two new instruction prefixes, XACQUIRE and XRELEASE. The basic concept is that the thread executes XACQUIRE, an arbitrary stream of instructions plus XRELEASE. Logically, this section can be seen as "lock( );Instructions( );unlock( )". Even though one thread may be executing this section, the other threads see this section as free. In case a violation (meaning other threads enter the critical section) is detected by the processor, the inflight transaction is aborted and the thread restarts the instructions stream from the XACQUIRE. All the instructions are committed after XRELEASE are executed with no violation detected.

TSX is a good hardware-based solution to improve software systems that are heavily threaded accessing small but frequently shared streams of address and code. However, this mechanism is applied within a coherent domain (i.e. multi-socket system connected through UPI). With increasing volumes of datasets, transactional software such as databases, need to be able to operate on several shared memory systems over a high speed interconnect, such as a fabric. There may be several 10s of these systems connected via the interconnect, and they will span different coherent domains (a domain could be a single system or a group of systems).

BRIEF DESCRIPTION OF THE DRAWINGS

The present invention is illustrated by way of example and not limitation in the figures of the accompanying drawings, in which like references indicate similar elements and in which:

FIG. 5 illustrates an exemplary embodiment of the use of protect range on the receiving side;

FIG. 6 illustrates an exemplary embodiment of the use of unprotect range on the receiving side;

FIG. 13A is a block diagram illustrating both an exemplary in-order pipeline and an exemplary register renaming, out-of-order issue/execution pipeline according to embodiments of the invention;

FIG. 13B is a block diagram illustrating both an exemplary embodiment of an in-order architecture core and an exemplary register renaming, out-of-order issue/execution architecture core to be included in a processor according to embodiments of the invention;

FIGS. 14A-B illustrate a block diagram of a more specific exemplary in-order core architecture, which core would be one of several logic blocks (including other cores of the same type and/or different types) in a chip;

DETAILED DESCRIPTION

Figure 1:
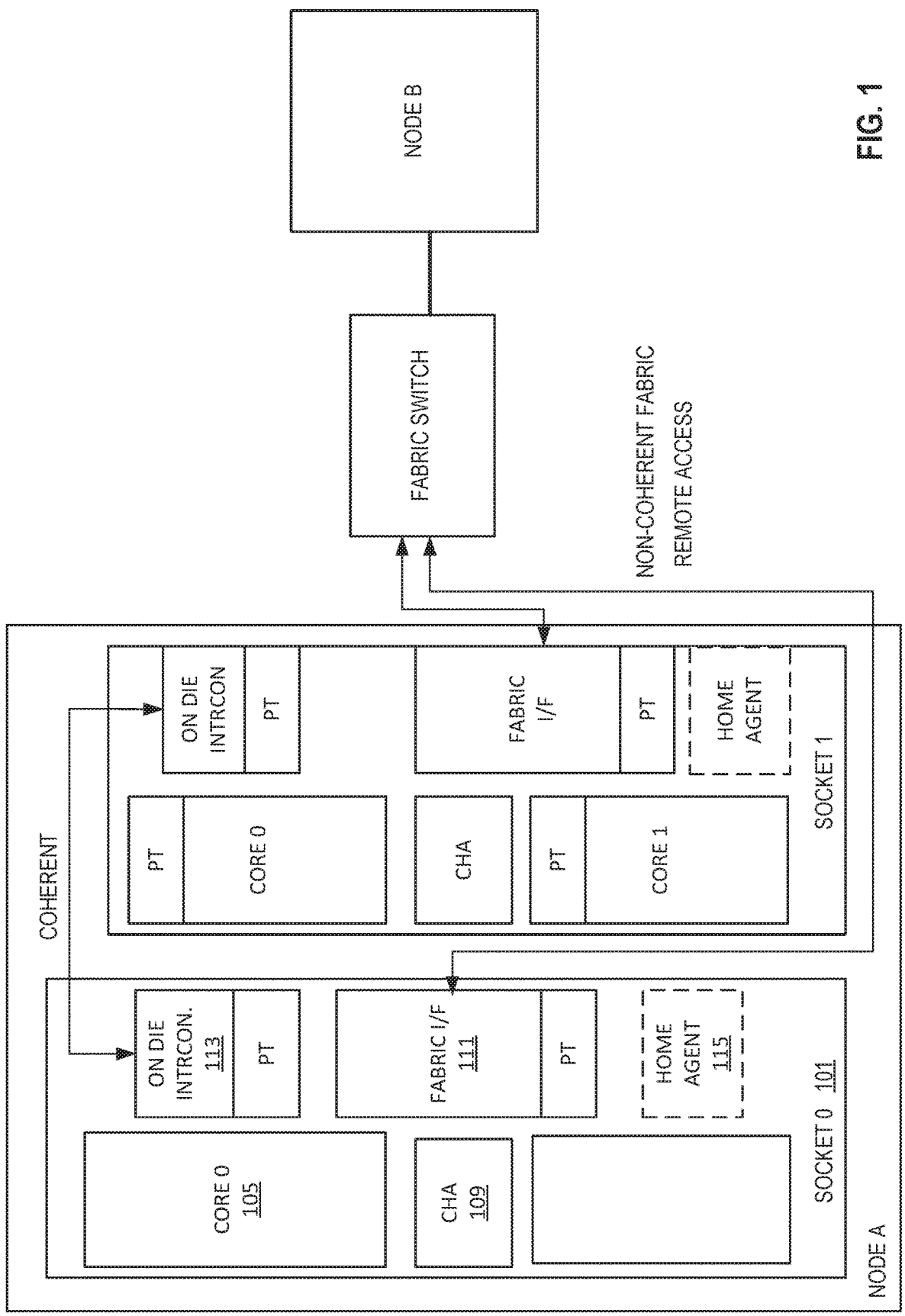
FIG. 1 illustrates an embodiment of a system that supports remote monitoring.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Heavy investment in improvements in memory, storage, fabric and interconnect technologies has resulted in the potential for distributed shared memory systems (DSM) to meet the requirements for enterprise and big data applications. With fabric latencies projected to reach within an order of memory latencies, a distributed shared memory system can offer a large, single address space to a cluster of servers on a fabric; thus offering a scalable, cost-efficient alternative to "scale-up" node-controller systems. These node-controllers will provide access to storage and memory technologies and protocols like NVM or NBOD).

However, one of the drawbacks of DSM is the cache coherence problem for an application's memory references. For an enterprise or big data application, several types of memory references, such as the stack and temporary storage per process that is running on a system need not be coherent. On the other hand, there are often sections of code where the application needs to ensure coherence (for example: a critical section for transaction processing). To implement coherency, new software schemes based on hardware schemes are provided by the next generation of data centers. Thus, software stack, using certain hardware functionalities, will provide ways to the application to implement coherency or consistency among the different processes and threads running in the data center.

Enterprise applications tend to be highly complex. Thus, they rely on many different components that are coded with several millions of lines of code. These applications are commonly multi-threaded. In many scenarios they run with several thousands of threads at the same time and with DSM, all these threads will share the same address space potentially across tens of servers. In such environments, the probability of having software bugs (either in the application or libraries) related to threads accessing to wrong memory regions will be much higher with respect to the current architectures. Therefore, exposing mechanisms to protect and detect such memory accesses will be fundamental to software adoption and the success of our future DSM architectures. Without hardware support, arbitrating or detecting memory corruptions in DSM among several thousand threads across tens of nodes will be a tedious or impossible task.

Detailed herein is are embodiments to prevent memory corruption between different threads that are using DSM. The thread performing the violation can be notified via a page fault when a violation would occur and does not let it happen. In many instances, this helps prevent software bugs like stray pointers or buffer overflows to generate memory corruptions in DSM.

This allows threads running in one node protect a given memory region homed by another node with a specified mode for access. Any access done by any other thread in the cluster should generate a fault and propagate the information to the system.

Figure 10:
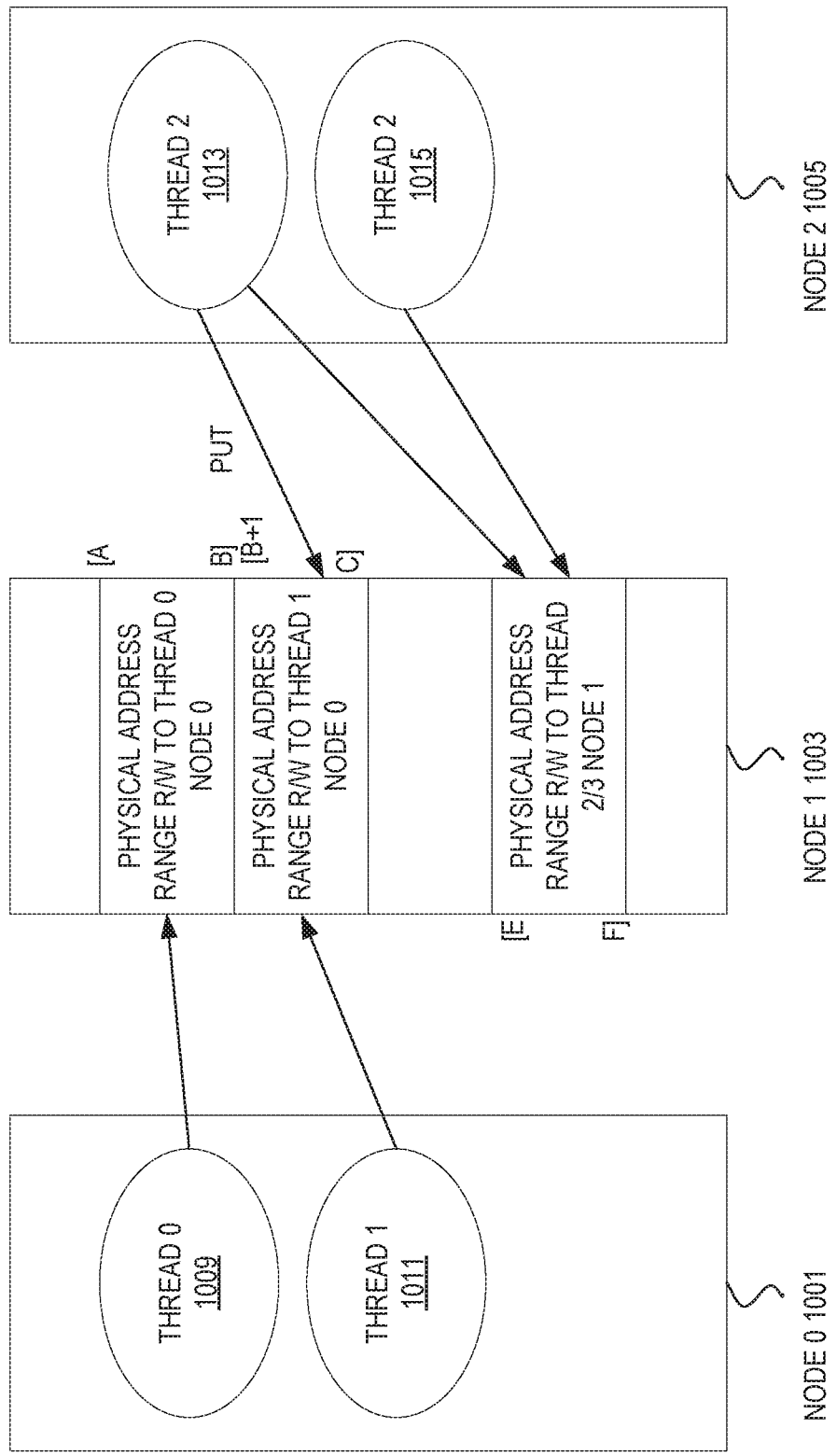
FIG. 10 illustrates an example of a situation that could potentially cause huge problems of in terms of software reliability and debuggability.

FIG. 10 illustrates an example of a situation that could potentially cause huge problems of in terms of software reliability and debuggability. A database has threads running in nodes 0 1001, 1 1003 and 2 1005. Node 1 1003 exposes memory to nodes 0 1001 and 2 1005. Nodes 0 1001 and 2 1005 have two threads 1009, 1011 and 1013, 1015 accessing remote memory.

The database software stack assigns to Thread 0 1009 access to [a,b], Thread 1 1011 access to [b+1,c] and to Threads 2 1013 and 3 1015 access to [e,f]. Due to a software bug implementation (for example, a corrupt pointer or buffer overflow), Thread 2 1013 accidentally generates a memory reference that ends an address space that is meant to be used (theoretically) exclusively by thread 0 1109. This results in memory corruption.

With embodiments detailed herein, hardware would allow the database to protect each of the different memory regions that threads 0, 1, 2, and 3 are accessing.

Figure 11:
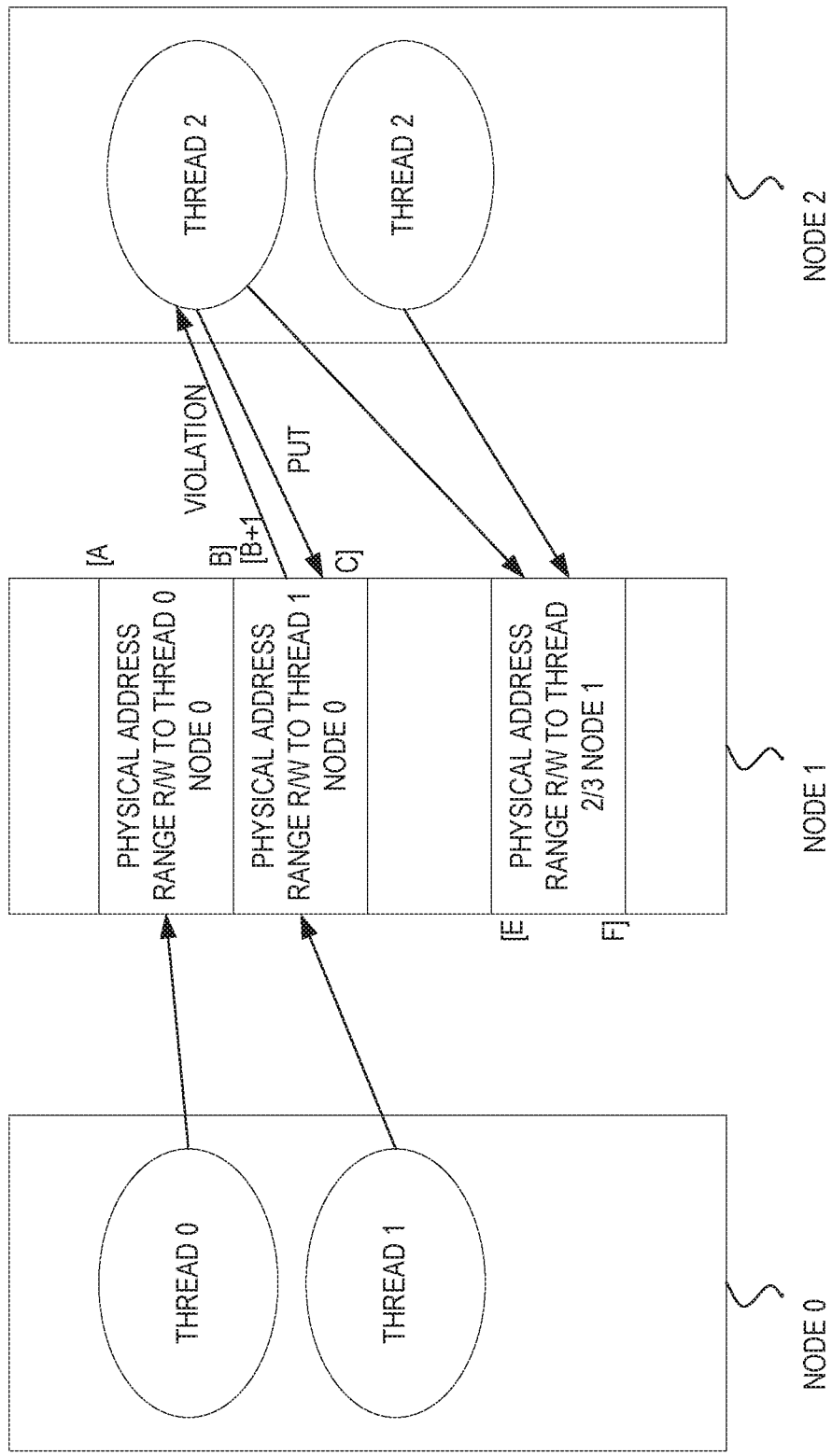
FIG. 11 illustrates an example of a situation having a range violation.

FIG. 11 illustrates an example of a situation having a range violation. In this example, the put by thread 2 in the address space of thread 1 would signal a violation. In this instance, a page fault would be signaled.

Detailed herein are interfaces (instructions) that allow a software thread to specify that a given set of instructions is bound to a specific type of access to a certain memory range. Any access to this address space performed by any other thread (in or outside the coherent domain) in the specified mode will generate a page fault in the requestor side and carry out other specific actions depending on the previous registration.

Embodiments of hardware and methods of its use to implement remote address access monitoring are detailed herein. FIG. 1 illustrates an embodiment of a system that supports remote monitoring. A typical socket 101 includes a plurality of processor cores 105, on die interconnect hardware 113, and a fabric interface 111. Remote monitoring may be from socket to socket within a node (through a coherent on die interconnect 113) or between nodes using a fabric switch and a fabric interface 111. As such, depending on the address space that monitor requests are targeting, requests may go to the same node's local memory, they may go the on die interconnect 113 to route the request to the other processors within the same coherent domain, or they may go to processors through a Host Fabric Interface (HFI) 111 that are outside the coherent domain. One system can be composed by one or more coherent domains being all the coherent domains connected through fabric interconnect. For example, high performance computing or data centers are composed by N clusters or servers that can communicate with each other using the fabric. Using the fabric, each coherent domain can expose some address regions to the other coherent domains. However, accesses between different coherent domains are not coherent. In most instances, the fabric allows for mapping address of memory ranges between different coherent domains.

Nodes also typically have caching agents and/or home agents 115. Caching agents are the coherency agents within a node that process memory requests from the cores within the same node. Home agents (HA) are the node clusters that are responsible of processing memory requests from the caching agents and act as a home for part of the memory address space (one die can have multiple Homes having a distributed address space mapping). In this illustration, there is a home agent 115 per socket, however, in some embodiments there is one home agent per node. Further, in some embodiments, the functionality of the home agent is included in the caching agent and called a caching home agent (CHA) as shown as 109. Throughout this description, CHA is typically used for ease in description.

A caching agent (such as CHA 109) is an entity which may initiate transactions into coherent memory, and which may retain copies in its own cache structure. The caching agent is defined by the messages it may sink and source according to the behaviors defined in the cache coherence protocol. A caching agent can also provide copies of the coherent memory contents to other caching agents. A home agent (such as CHA 109 or home agent 115) is an entity which services coherent transactions, including handshaking as necessary with caching agents. A home agent supervises a portion of the coherent memory. A home agent is responsible for managing the conflicts that might arise among the different caching agents. It provides the appropriate data and ownership responses as required by a given transaction's flow.

Further, the home agents include a distributed directory that has the following states for memory addresses: clean (this is the only copy, for example, lines that are just written back), any (any remote socket within the node may have a copy), and invalid (the local socket's cache has a copy). An additional state (remote) indicates that a remote node has requested a copy and may have and may be updated when a request for the line originates from the fabric.

One logical place to add a monitoring scheme is the home agents inside the node, and in some embodiments, that is the case. However, when distributed schemes map address spaces in the HA (node controller, hashing schemes, hemisphere, quadrant schemes, etc.), this may add too much complexity in terms of design, area and validation. As such, in some embodiments, this monitoring information is kept as a protection table (PT) 103: 1) in the proxies to the node, that tunnel any memory transaction coming from other nodes to the home node (fabric interface 111), 2) the cores inside the node 105, and 3) the unique agents that can access the local memory without going through the proxies (on die interconnect 113), to identify accesses. This table is used by a monitor circuit (not shown) which tracks memory/cache accesses, compares those accesses to the table, and alerts the originating core of any accesses as requested.

In some embodiments, a distributed memory monitoring scheme allows the core to register at the home nodes to monitor the address range of interest. The monitoring scheme allows for discovering when a given line that is accessed by other caching agents in the system falls within the specified address range; accordingly, it updates the sharer's valid bits for the given range. The core that requests the tracking for the address range uses a tag directory structure 107 to denote the sockets in the cluster that have access to the specific address range and is used by the core to track/monitor the address range.

This directory is a non-perfect tag directory in two dimensions. First, given that the whole system can have a very large address space, different addresses can match in the same tag entry (explained below). Second, each bit in the sharer's remote tracking information (e.g., bit mask or bloom filter) corresponds to a group of caching agents in the system. Filtering hardware associated with the tag directory per core performs Bloom or other filtering to test inclusion in a set.

Figure 2:
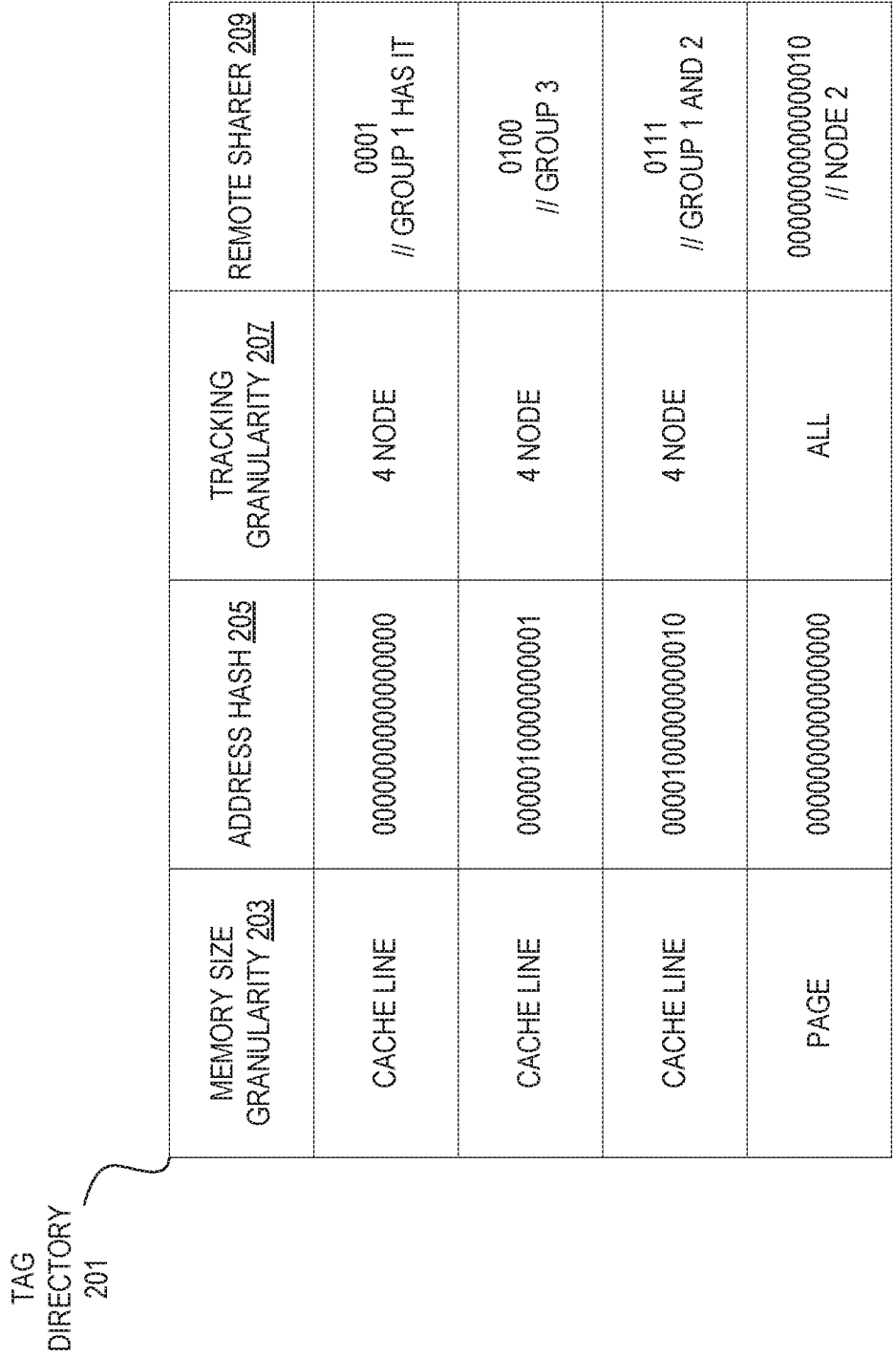
FIG. 2 illustrates an embodiment of the tag directory.

FIG. 2 illustrates an embodiment of the tag directory. An entry in the tag directory 201 includes fields for tracking size granularity 203, address hash 205, tracking granularity 207, and remote sharer information 209.

The tracking size 203 and tracking granularity 207 can be provided through a mcoherent call as detailed above. As such, the number of rows in the directory can be reduced using page-level or huge page level tracking instead of cache line tracking.

As a simplified example, assume a hypothetical cluster of 8 nodes, 2 sockets each and consider each node has only 4 MB of memory (65K lines of 64 B each). Now there are 65K row entries in the look-up-directory, each corresponding to a line in the node. In this scenario, the 16 bit bit-mask accurately tracks the sockets which have requested memory from this node. However, in reality, systems have much, much larger memory and the space requirements for the look-up-directory can quickly become impractical. For this reason, the directory non-perfect.

Bloom filtering, or node groups, or a subset of nodes 209 instead of the bit mask to reduce the space complexity for the directory.

In order to provide scalability, in some embodiments, cache line addresses 205 are hashed onto rows in the directory using a hash function H( ), note that number of rows is less than the number of cache lines. A good choice of H( ) can result in fewer collisions, for example, using lower-order bits of the cache line address ensures good distribution for the hashing function. Note that having collisions does not mean any loss of correctness; it merely indicates potential false positives: since two cache lines map onto the same row in the directory, we will end up snooping the union of the "remote nodes" for the two cache lines.

With the choice of a good hash function, and the use of the distributed directory bits (the tag directory need only be consulted if the distributed directory bit for the cache line says "remote") the probability of false positives becomes small. At the same time, the number of nodes requiring snoops is significantly reduced. As mentioned earlier, further tradeoffs are possible by varying the granularity of hashing, and using bloom filter tracking instead of a bit-mask based on hints specified by the application Each proxy and core can contain a fixed number of protection entries in its protection table. Each protection entry contains the address range, the original home requesting to protect, and all the associated information (attributes and actions). If there are no free entries, the action fails. That action also fails when the address rant. The action would also fail if the address range being requested overlaps with another monitoring entry. In a case of failure, a fail response would be sent back to the originator fabric and it would be communicated to the software stack. Eventually, the software would get notified in case of failure and it would need to take corresponding actions. A different way to propagate the failure to the software stack could be issuing a callback to the software stack from the core.

To allow protecting of a given address range which is being monitored by a given core, in some embodiments instructions and messages for protection initialization (Protect_Range) and protection release (Unprotect_Range) are supported by processor cores. These instructions provide a new interface that allows a software thread to specify that a given set of instructions is bound to a specific type of access to a certain memory range. Any access to this address space performed by any other thread (in or outside the coherent domain) in the specified mode will be automatically notified to the software stack. From this point, the software stack is the one responsible of taking a specific action (for example, restart the copy of the monitored object).

An embodiment of the PROTECT_RANGE and UNPROTECT_RANGE instructions are:
PROTECT_RANGE base_address, granularity, mode, size, action
UNPROTECT_RANGE The semantic of PROTECT_RANGE is the following, the thread provides a base line address, the granularity of address space that needs to be monitored, the monitoring mode, and size. The granularity can be, for example, a cache line, memory line, KB, MB or GB (for example, coded as: 0, 1, 2, 3, 4). The size specifies the multiple of the granularity space that needs to be monitored. The mode specifies what type of violation is being monitored read (R) or write (W) (for example, W mode would imply that the thread will get notified if the address region is accessed with a write operation). The "action" specifies what the home node controlling the access to this range is to take: (a) generate a notification to the requesting thread/node; (b) generate a notification in a specific context of the home node (e.g., one entity registers a protection monitor while another processes violations); (c) generate a notification in the thread/node that has ownership of the violated address range; and (d) any combination of a, b or c.

In order to be able propagate a page fault to one of the threads of the node that homes the protected range, the third instruction would be executed in all the nodes of the data center. The specified thread is responsible to take one or more specific actions when a page fault caused by protection violation happens in the local node. These different ways to propagate the protection violation io provide flexibility to the software stack to take distributed and potentially independent decisions once a protection violation is detected.

The following example shows a way to bind the instructions within the transaction to the address space corresponding to [300000, 300000+4 MB] in read/write mode and specifying that only owner should receive a page fault: Protect_range 300000,2,4, W, Requestor.

The execution of PROTECT_RANGE causes a PROTECT_RANGE message to be sent from the initiating (originating) core to its local caching agent to be propagated to the remote cores, etc. to set up monitoring (e.g., protection table(s)). In some embodiments, the protection table for the executing core is also set (for example, when the information in the protection table is duplicated across cores, proxies, etc. in nodes).

The execution of UNPROTECT_RANGE stops the monitor(s) and removes an associated protection table.

Figure 3:
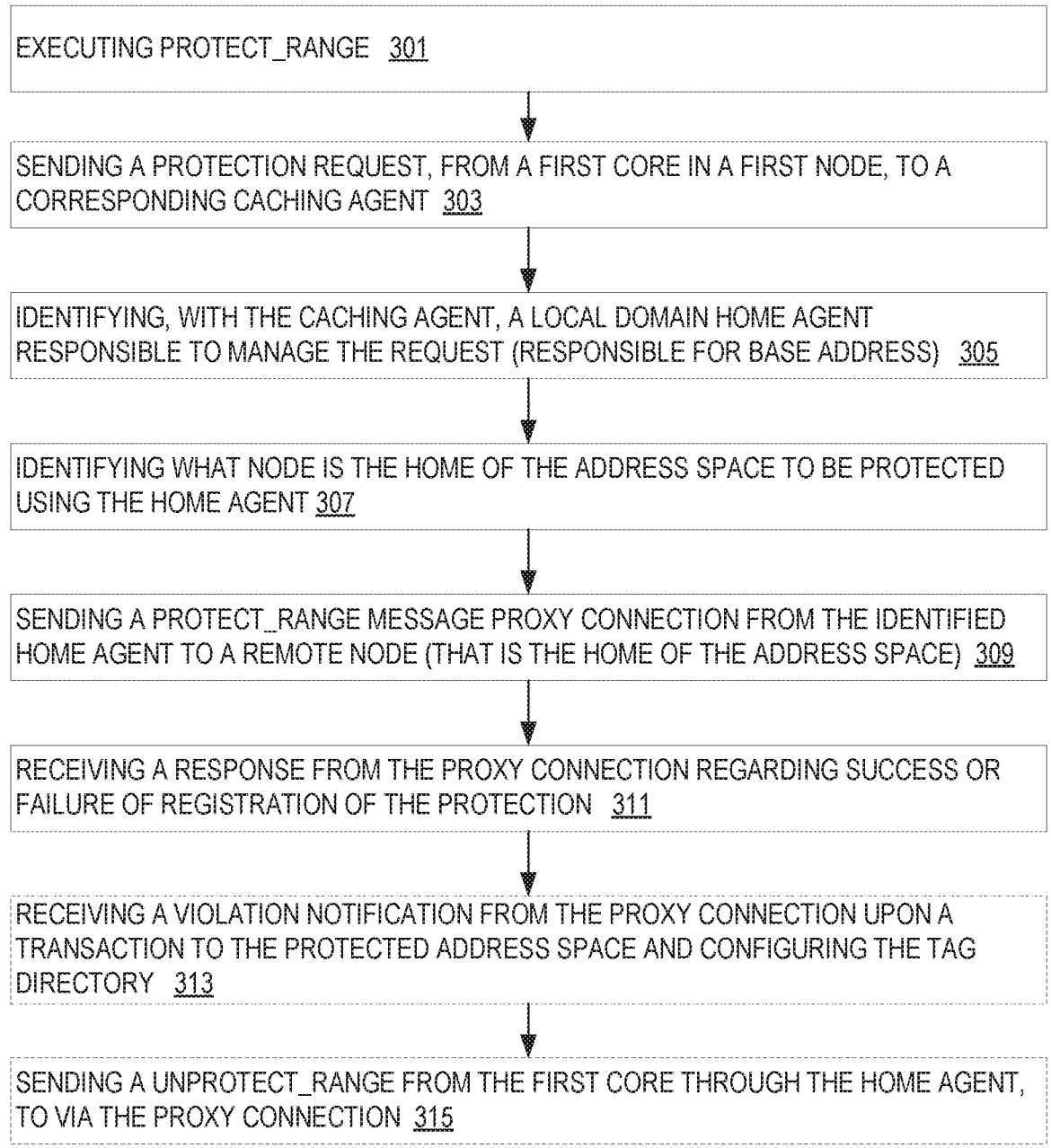
FIG. 3 illustrates an exemplary embodiment of the use of protect range.

FIG. 3 illustrates an exemplary embodiment of the use of PROTECT_RANGE. At 301, a first core (originating core) in a first node, executes an PROTECT_RANGE instruction. For example, in FIG. 1, core 0 105 executes a PROTECT_RANGE instruction.

This execution causes a monitoring request (PROTECT_RANGE message) to be sent from the first core to its corresponding caching agent at 303. This request includes the information (base address, granularity, size, and mode) from the instruction. The caching agent manages the baseline address to setup the requested monitor. This caching agent is separate from the home agent depending upon the implementation. For example, in FIG. 1, the core 105 sends a request to CHA 109 (combined caching and home agent). In other words, the core alerts the caching agent of the address (AS) that it wants monitored [base_address to base_address+granularity*size] with the provided attributes and actions.

At 305, in some embodiments, the caching agent identifies a local domain home agent responsible to manage the request. For example, the home agent responsible for the base address. Note that the identified home agent may be combined in the same entity (CHA) as the caching agent as detailed above.

The identified home agent identifies what node in the system is the home for the address space that the core (thread) wants to monitor (it can be the local coherent domain) at 307.

Once the home for the address region is identified, a request is sent to the proxy (in the illustration of FIG. 1 the fabric 111 or on die interconnect 113) to setup a monitor in the home node at 309. In other words, a protection message proxy connect (PROTECT_RANGE message) is sent from the identified home agent to a remote node which is the home of the address space at 309. Note that the node can belong to a different coherent domain and use the fabric, or it could be within the same coherent domain. In that case the proxy would be an on die interconnect.

A response from the proxy connect regarding the success or failure of the registration of the protection monitor is received by the originating core at 311. Examples of what may cause a failure include, but are not limited to, overlapping address spaces, no free monitor space, and hardware failure. If the monitor(s) is/are successful, then the tag directory for the core is updated. Further, in most embodiments, a protection table is updated across all proxies in the socket upon an acknowledgment of one or more monitors being configured.

Figure 4:
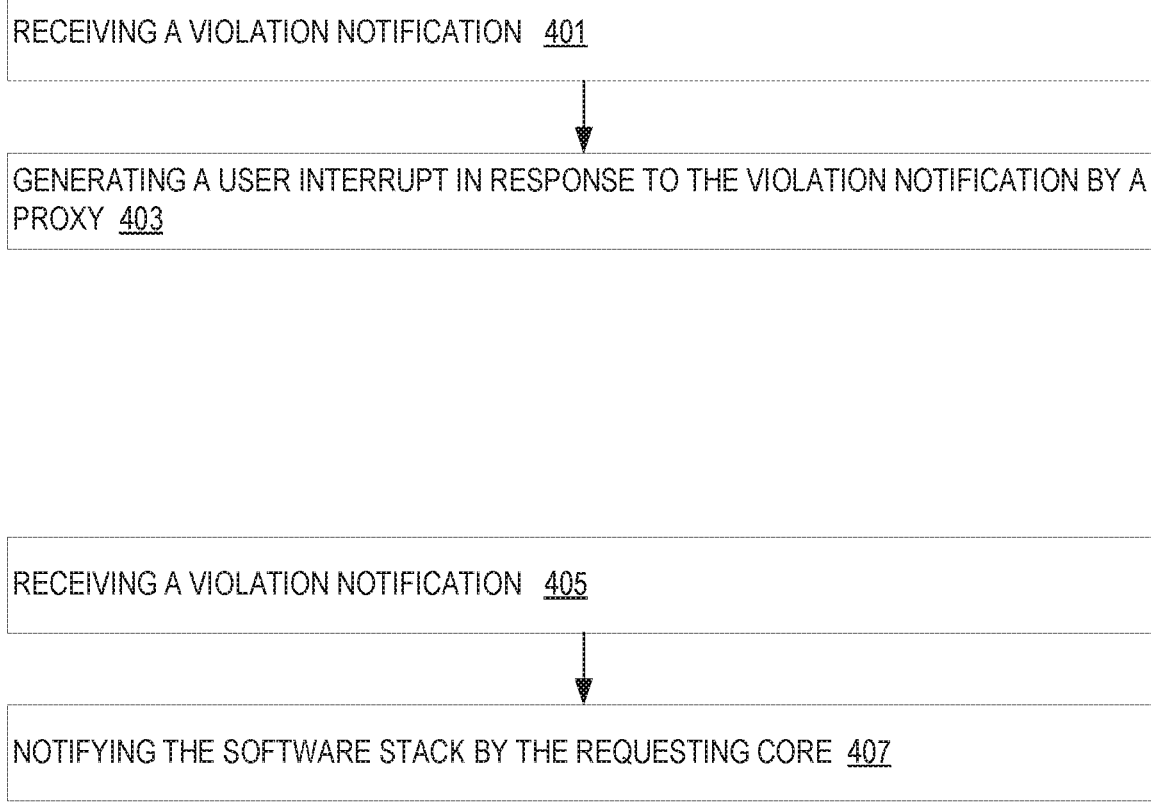
FIG. 4 illustrates two embodiments for handling a remote monitoring violation.

After registration, in some embodiments, a notification of a violation upon a transaction to the monitored address space is received at 313. For example, a remote monitor processes a write to the monitored address. This may be received by the core or a proxy. FIG. 4 illustrates two embodiments for handling a remote monitoring violation. At 401, a violation notification is received by the core. This causes the core to generate a user interrupt at 403.

Alternatively, at 405, a violation notification is received by the core. This causes the core to notify the software stack at 409. In either case, the software stack is the responsible to take the proper actions to address the failure. In the case of action (a), the request violating the protected region would do forward progress in order to de-allocate the structures in the CHA. However, the returned status to the requestor core (instead of being any MESI or MEOSIF state would the notification of violation). The requestor core would generate then a page fault similar as current processors do with page faults with the protection keys mechanisms. If action (a) is not configured, then the requestor node would simply receive the data. The core propagates the violation to the user space.

In case of success, where all the different operations are executed without a violation the requesting core, an unprotect_range message(de-registration) is sent from the first core to the monitoring proxies at 313. For example, the core executes a UNPROTECT_RANGE instruction to release the monitors and once the release instruction is executed the core notifies the release to the remote proxy (HFI of Socket B in the example). The proxy propagates the release notification to the real home for this monitor and cores.

FIG. 5 illustrates an exemplary embodiment of the use of PROTECT_RANGE on the receiving side. At 501, a proxy of the receiving node receives a request to start a protection monitor. In other words, a protection message proxy connect (PROTECT_RANGE message) is received at the remote node which is the home of the address space. Note that the node can belong to a different coherent domain and use the fabric, or it could be within the same coherent domain. In that case the proxy would be an on die interconnect.

This request is sent to cores and proxies at 503.

Acknowledgements from the cores and proxies regarding the request is received by the receiving proxy (e.g., fabric) at 505. For example, is the protection monitor successfully setup or not. These acknowledgments typically include an identifier of the responder.

These acknowledgments are processed by the proxy into a single acknowledgment which is sent to the originating core at 507. The acknowledgment to the originating core includes identifiers of where monitoring is taking place.

FIG. 6 illustrates an exemplary embodiment of the use of UNPROTECT_RANGE on the receiving side. At 601, a proxy of the receiving node receives a request to release a monitor. In other words, a monitoring message proxy connect (UNPROTECT_RANGE message) is received at the remote node which is the home of the address space at 309. Note that the node can belong to a different coherent domain and use the fabric, or it could be within the same coherent domain. In that case the proxy would be an on die interconnect.

This request is sent to cores and proxies at 603.

Acknowledgements from the cores and proxies regarding the request is received by the receiving proxy (e.g., fabric) at 605. For example, is the monitor stopped or not. These acknowledgments typically include an identifier of the responder.

These acknowledgments are processed by the proxy into a single acknowledgment which is sent to the originating core at 607. The acknowledgment to the originating core includes identifiers of where monitoring has stopped.

Figure 7:
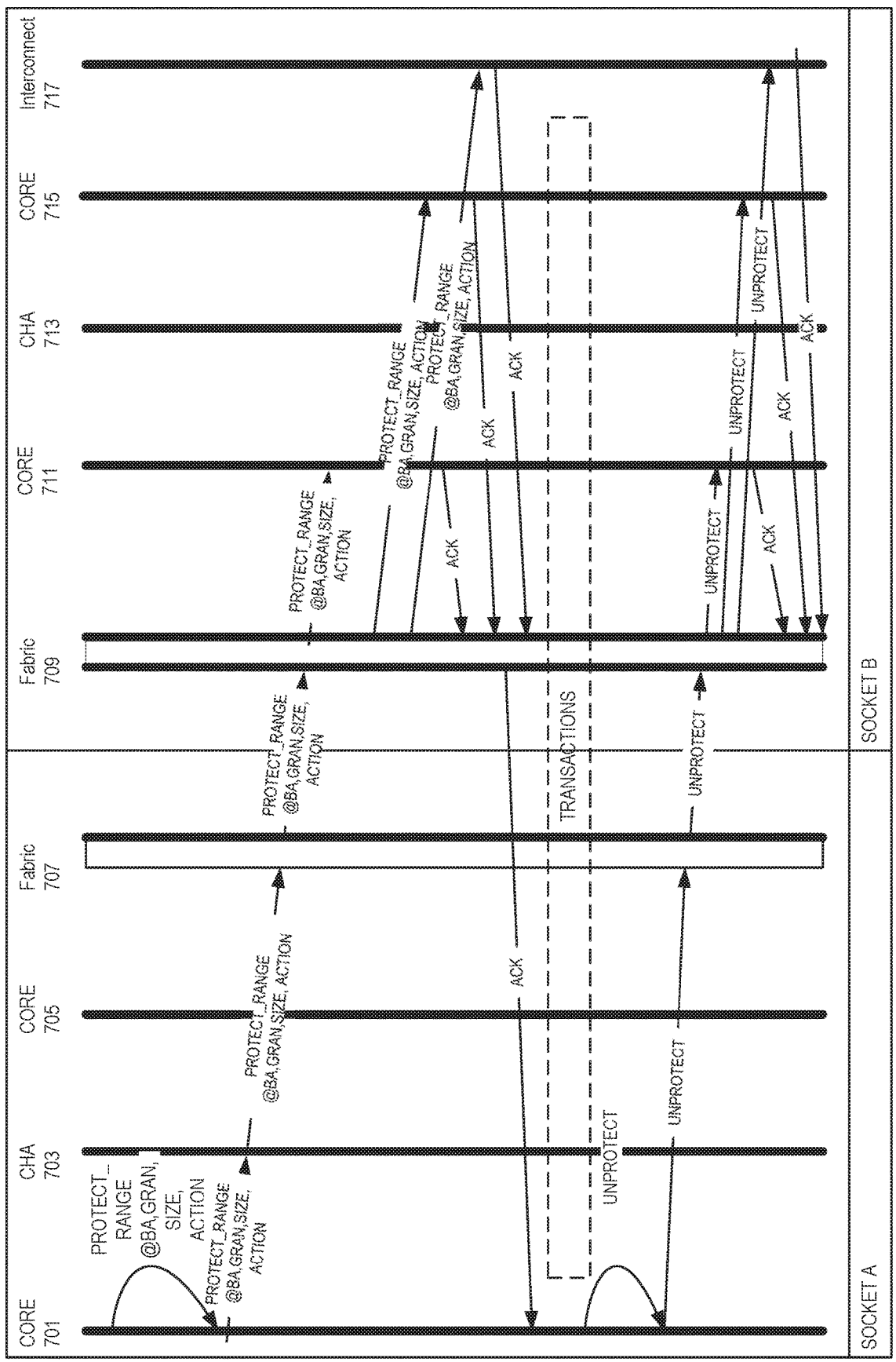
FIG. 7 illustrates an example of an initialization and finalization flow using protect range and unprotect range.

FIG. 7 illustrates an example of an initialization and finalization flow using PROTECT_RANGE and UNPROTECT_RANGE. An initiating core 701 decodes and executes a PROTECT_RANGE instruction. For example, a thread on core 701 executes an PROTECT_RANGE instruction. This instruction provides a base address, granularity of the space to be monitored (e.g., memory line, KB, MB, or GB), the size, and the mode.

The core 701 in Node A sends a request to the local caching agent managing the baseline address (CHA: CA+HA) in order to setup a monitor. The core 701 notifies the CHA that it wants to monitor the address space (AS) where AS=[@base_address to base_address+ granularity*size] with action(s) to perform.

The CHA 703 identifies to what home (such as a socket) the specified memory region is mapped. In some embodiments, if the region belongs to several homes the instruction is aborted. The CHA 703 identifies what is the home agent in the local coherent domain that is responsible to manage the request the address (base_address). The home agent (CHA 703) identifies what node (socket) in the system is the Home for the address space that the thread wants to monitor (it can be the local coherent domain).

The CHA 703 sends a protection message proxy connection fabric 707 to send to the remote node acting as a Home for AS. On the target side, the proxy generates a multicast message that targets including proxies to the socket such any on die interconnect agent in the node 717 and any fabric interconnect agent 709 in the node and all the cores 711 and 715 in the home socket.

All the target destinations respond success or failure about the registration of the monitor with acknowledgement messages. Typically, the responses will be collapsed by the proxy in the home node that received the monitoring request (in this example fabric 709). In case of failure it will propagate the notification to the requestor and will cancel the registration to the rest of peers inside the home node.

In case that any proxy agent or core identifies a transaction to the address space violating the requested monitoring AS, they will send a violation message to the core 701 notifying it of the violation. The core 701 propagates the violation to the user space.

When there are no issues, or there has been a violation detected, the core 701 will send a de-registration message once a UNPROTECT_RANGE instruction is decoded and executed alerting the proxies that the core does not need more monitoring on AS. Once the release instruction is executed the Core notifies the release to the remote proxy (fabric 709). The proxy 709 propagates the release notification to the real home for this monitor and cores. Note that the core 701 would know the proxy identifier because of the acknowledgement received in the registration process detailed earlier.

As hinted at above, there may be times when given region space is detected as being accessed/modified accidentally other threads in the system. Three different situations may occur: 1) the address space is accessed by other Agents violating the protection mode. That would imply that the transaction has been violated and the proxy has to take the corresponding actions specified at the protect_region space. 2) No access is done by any other thread in the system. That would imply that no bogus behavior has happened and the protection resources could be freed. 3) Any other type of failure occurred. For example, remote nodes fail or a time out occurs. When an error occurs ((1) or (3)), similar to registration failure, the proxy that captured the violation would take one of the specific actions specified earlier.

Figure 8:
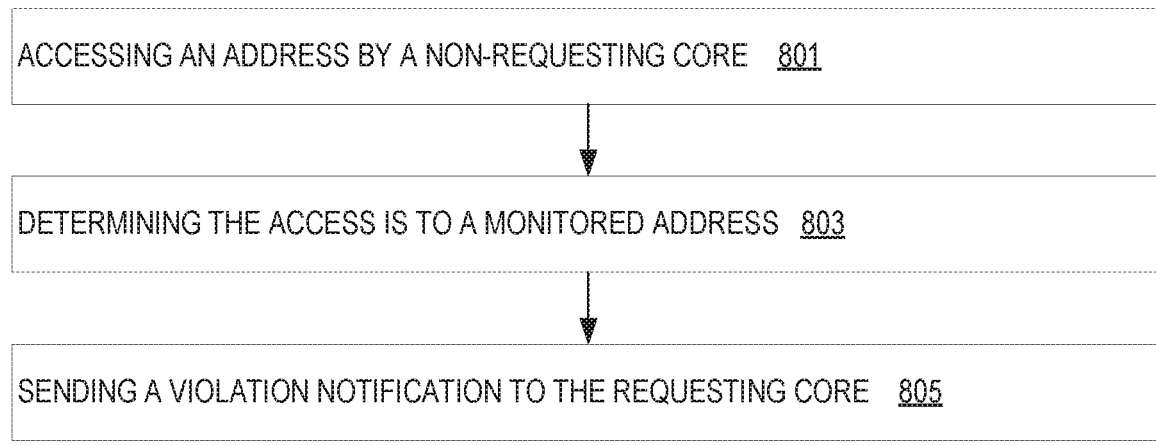
FIG. 8 illustrates an embodiment of a method for handling conflicts by a core that did not request a monitor (non-originating core)

FIG. 8 illustrates an embodiment of a method for handling conflicts by a core that did not request a monitor (non-originating core). At 801, the non-originating core writes or reads (accesses) a memory or cache address.

A determination that the access is to a protected address, and is of the type of access being monitored, is made at 803. For example, a determination that a write (type of access) to an address in a monitored address space is made. Of course, accesses to addresses not being monitored, or accesses to addresses being monitored, but not of the type being monitored, do not result in a conflict.

At 805, the non-originating core sends a violation notification to the core that requested the monitor. This notification may go through a fabric or interconnect interface depending upon how the cores are arranged.

Figure 9:
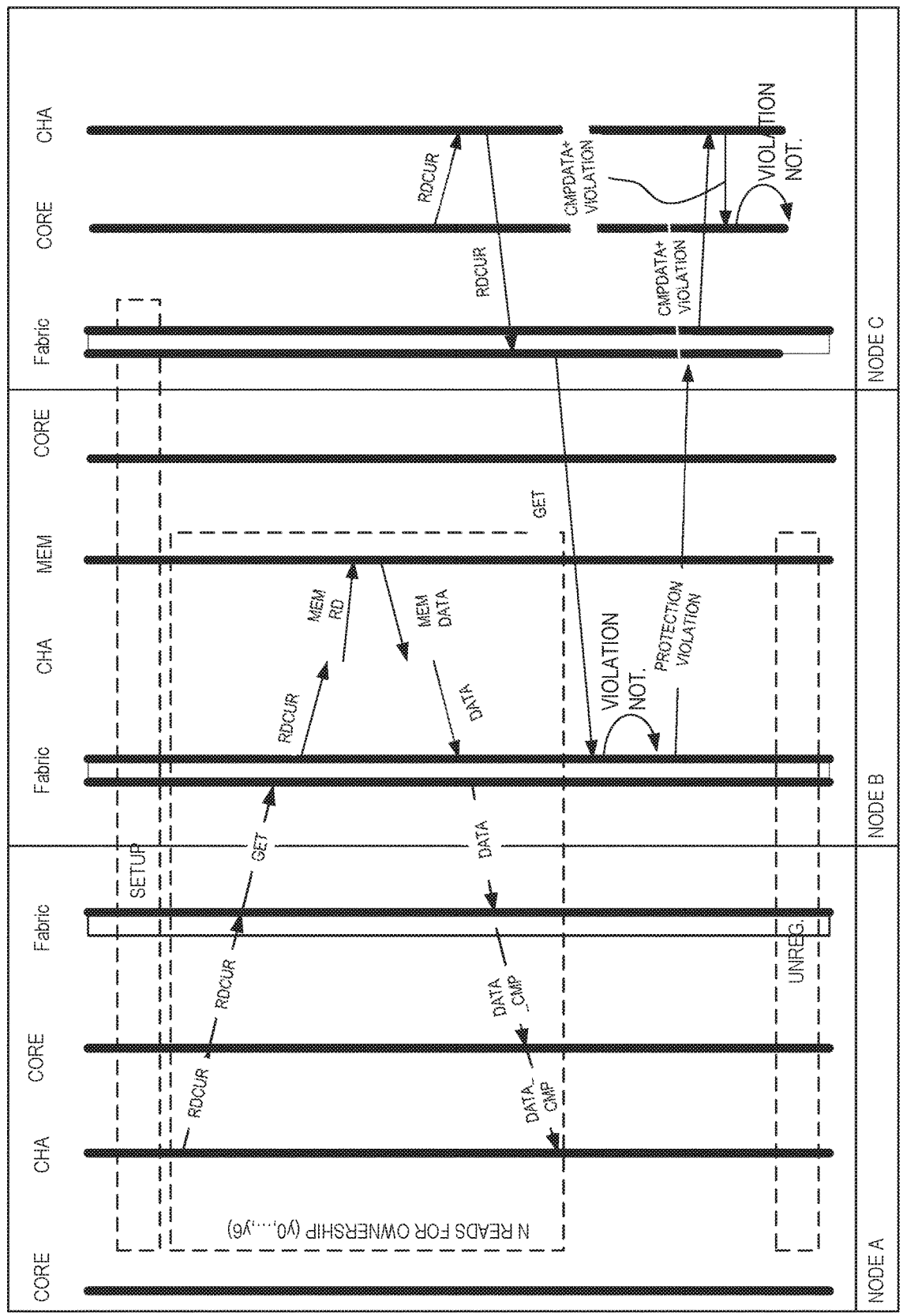
FIG. 9 illustrates an example of handling a conflict. In this example, setup (protect range) has already occurred.

FIG. 9 illustrates an example of handling a conflict. In this example, setup (PROTECT_RANGE) has already occurred. The protection specifies that only the requestor violating the request has to be page faulted. Second, a set of read operations are issued by the same thread (for example, this could be transactions of the Database to a part of the index server). Then, a bogus write operation is performed by Node C in the region being protected by Node A. The proxy HFI in Node B identifies that given address is being protected by Node A. Following the action specified in the protection entry, the HFI returns a completion to the requestor in node C indicating a violation occurred. CHA propagates the violation to the requestor core. The core generates a page fault to the context that caused the violation. Note that given the protection region action notification, Node A will keep doing normal work despite the violation has occurred.

The figures below detail exemplary architectures and systems to implement embodiments of the above. In some embodiments, one or more hardware components and/or instructions described above are emulated as detailed below, or implemented as software modules.

Exemplary Register Architecture

Figure 12:
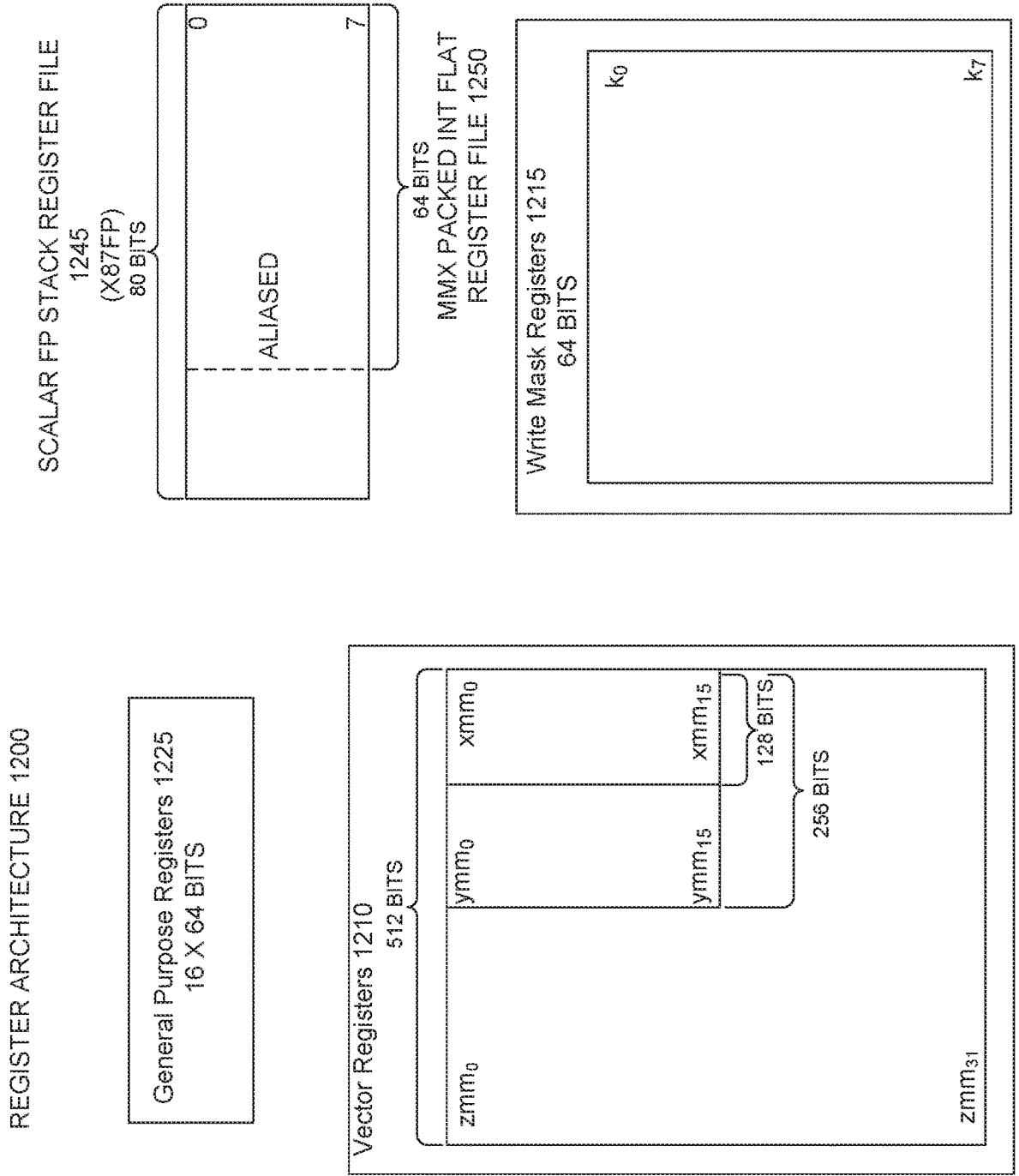
FIG. 12 is a block diagram of a register architecture according to one embodiment of the invention.

FIG. 12 is a block diagram of a register architecture 1200 according to one embodiment of the invention. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
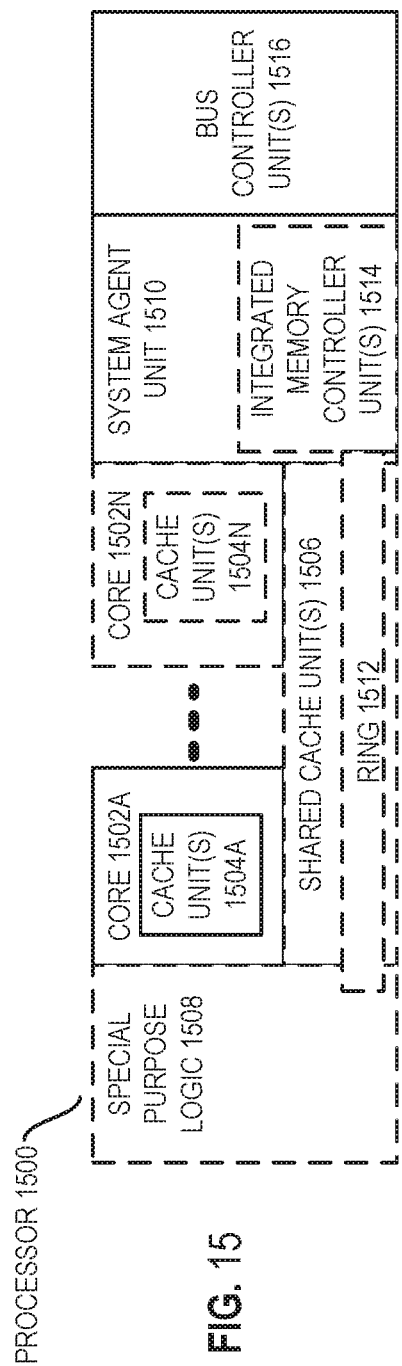
FIG. 15 is a block diagram of a processor that may have more than one core, may have an integrated memory controller, and may have integrated graphics according to embodiments of the invention.

FIG. 15 is a block diagram of a processor 1500 that may have more than one core, may have an integrated memory controller, and may have integrated graphics according to embodiments of the invention. The solid lined boxes in FIG.

15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
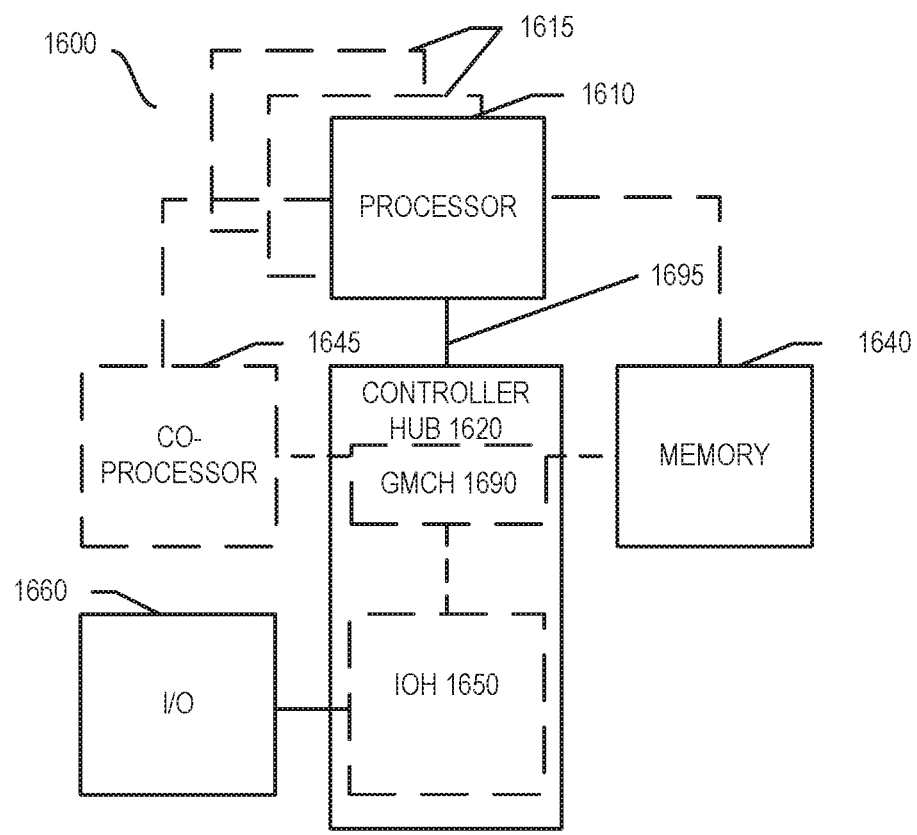
FIGS. 16-19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
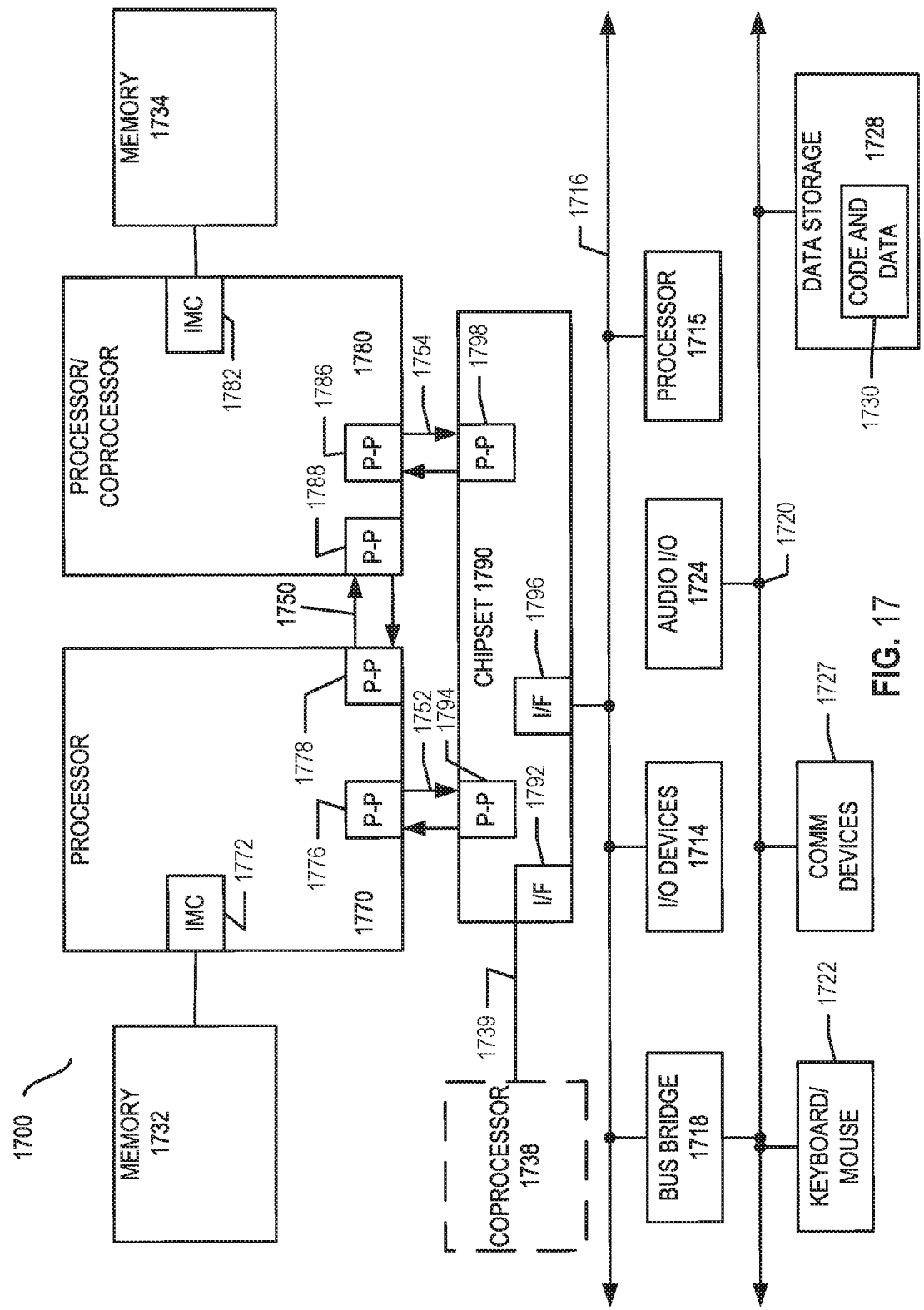

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
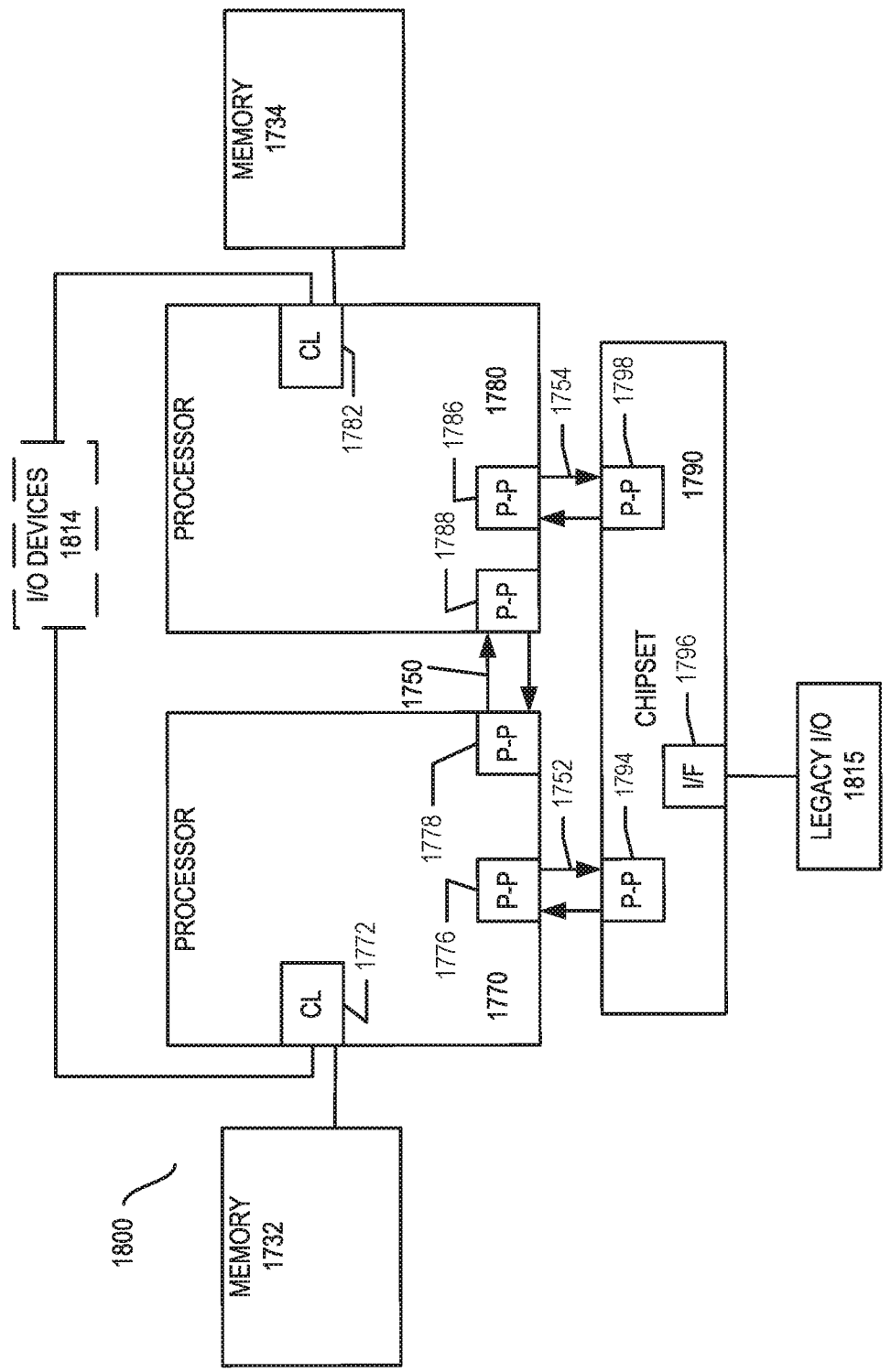

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
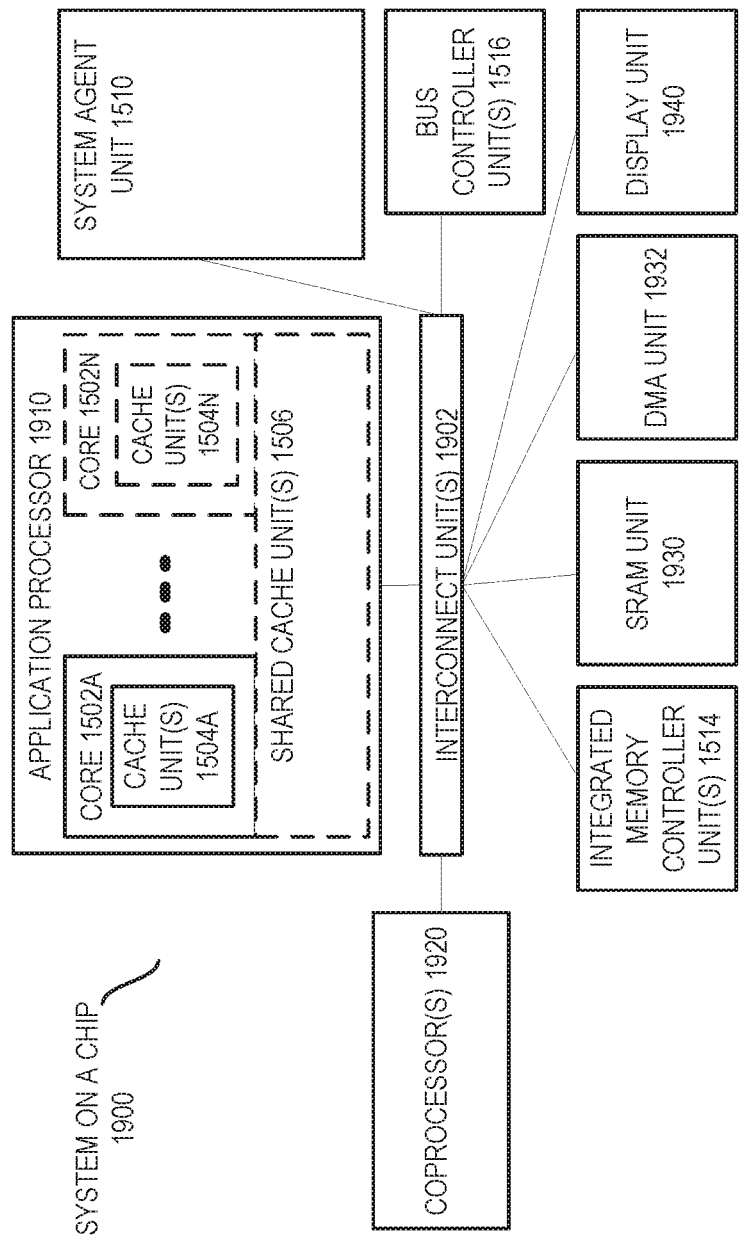

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 202A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
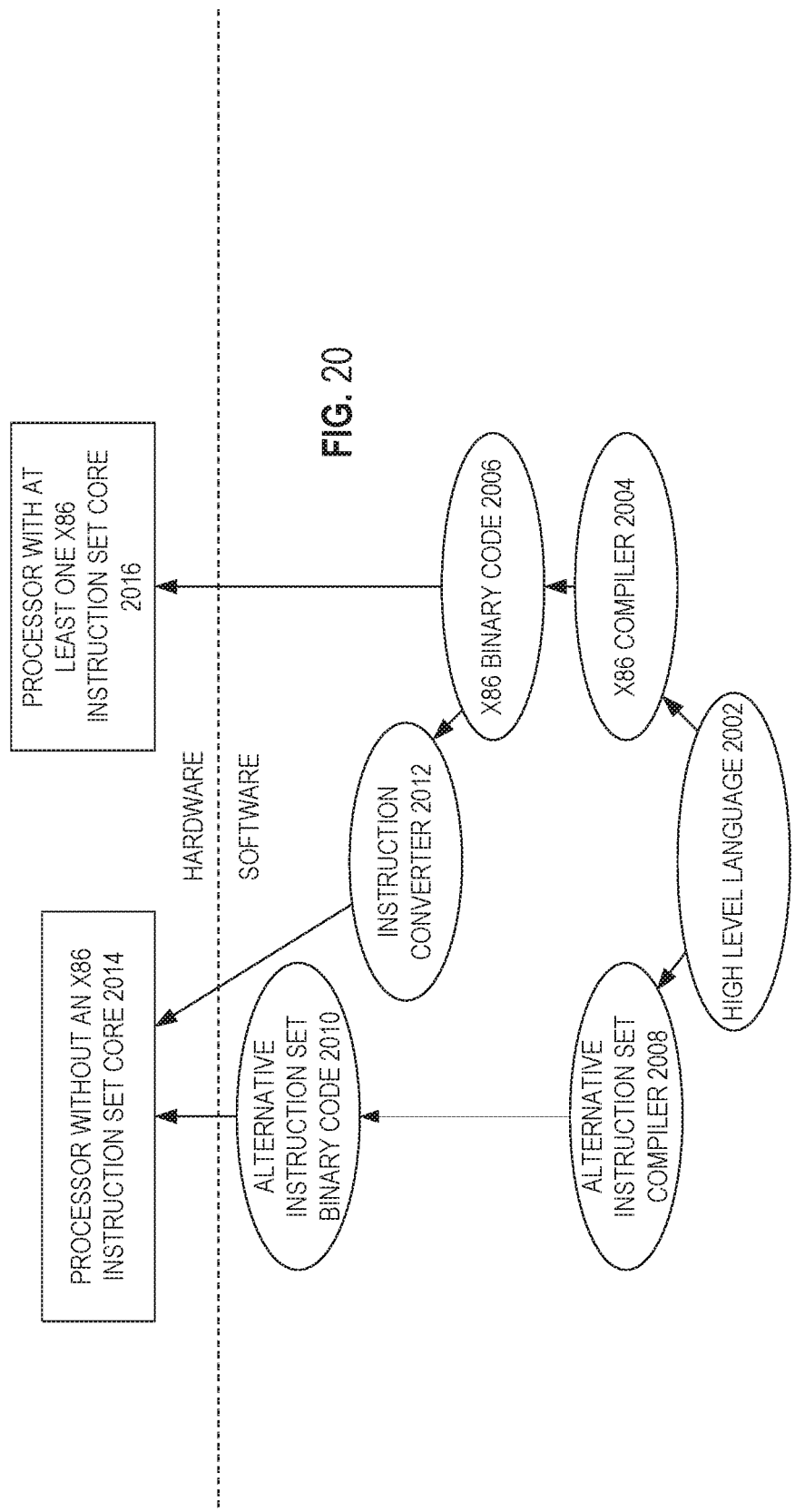
FIG. 20 is a block diagram contrasting the use of a software instruction converter to convert binary instructions in a source instruction set to binary instructions in a target instruction set according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

We claim:

1. An apparatus comprising:
   at least one monitoring circuit to monitor for memory accesses to a range of addresses of an address space and take action upon a violation to the address space, wherein the action is one of:
      to generate a notification to a node that requested the monitoring,
      to generate a notification in a specific context, and
      to generate a notification in a node that has ownership of the address space;
   at least one a protection table to store an identifier of the address space; and
   at least one hardware core to execute an instruction to enable the monitoring circuit, wherein the instruction is to include a base address, a memory size granularity, a tracking granularity, a mode, and an indication of the action to take.

2. The apparatus of claim 1, wherein the memory size granularity is one of cache line, page, large page, or huge page.

3. The apparatus of claim 1, wherein the tracking granularity is by number of node groups.

4. The apparatus of claim 1, wherein the mode is one of read and write.

5. The apparatus of claim 1, further comprising:
   caching agent circuitry to process memory requests from at least one of a plurality of hardware cores; and
   home agent circuitry to process memory requests from the caching agent and as a home for part of a memory space.

6. The apparatus of claim 1, further comprising:
   a buffer to store remote store requests that are a part of a transaction, wherein an execution of the instruction to enable the monitoring circuit is a part of that transaction.

* * * * *